United States Patent [19]

Carlson, Jr. et al.

[11] Patent Number: 5,676,566
[45] Date of Patent: Oct. 14, 1997

[54] MULTIMEDIA OUTLET

[75] Inventors: Robert C. Carlson, Jr., Torrington; John A. Siemon, Woodbury, both of Conn.

[73] Assignee: The Siemon Company, Watertown, Conn.

[21] Appl. No.: 424,857

[22] Filed: Apr. 21, 1995

Related U.S. Application Data

[63] Continuation-in-part of Ser. No. 334,783, Nov. 4, 1994, abandoned.

[51] Int. Cl.$^6$ ............................................ H01R 25/00
[52] U.S. Cl. ........................ 439/638; 439/718; 439/491
[58] Field of Search .......................... 439/638, 655, 439/696, 701, 676, 490, 491, 718

[56] References Cited

U.S. PATENT DOCUMENTS

| | | | |
|---|---|---|---|
| 5,143,868 | 9/1992 | Careney et al. | 439/638 |
| 5,211,583 | 5/1993 | Endo et al. | 439/491 |
| 5,236,371 | 8/1993 | Mathis | 439/501 |
| 5,241,593 | 8/1993 | Wagner | 439/501 |
| 5,295,869 | 3/1994 | Siemon et al. | 439/620 |
| 5,362,254 | 11/1994 | Siemon et al. | 439/491 |

OTHER PUBLICATIONS

Cabling Installation & Maintenance; Aug. 12, 1994; Modular Multimedia Outlets.

Systimax PDS Components Guide; Dec. 1990; 40A1 Multimedia Information Outlet.

The Wiremold Company; 2949FO –Fiber Optic Kit Installation Instructions.

AMP Incorporated; Surface Mount Outlet.

Catalog; Panduit Mod–Com Boxes –Component Section.

Mod–Tap; Multi Media Interface Installation Instructions; Oct. 1993.

Hubbel Premise Wiring, Inc.; Voice and Data Design Flexibility.

Siecor; Installation Procedure for the Siecor® UTS–Information Outlet; Oct. 1989.

Siecor; Siecor Universal Transport System Information Outlet (UTS–10).

Suttle Apparatus; Suttle Specifications.

Ortronics; Multimedia Outlet.

*Primary Examiner*—David L. Pirlot
*Attorney, Agent, or Firm*—Fishman, Dionne, Cantor & Colburn

[57] ABSTRACT

The multimedia outlet of the present invention exhibits a combination of form and function. The outlet provides six openings for various telecommunicating connectors that provide for up to 12 ports of mixed media or up to 24 fiber optic ports. Also, provided is a cable management arrangement complying with industry standards specifications. The form of the outlet, having inwardly angled sides allows for "true" gravity feed connections, which are desirable. The outlet also includes multiple cable access/raceway knockout ports and a concealed labeling system.

7 Claims, 15 Drawing Sheets

MULTIMEDIA OUTLET

CROSS-REFERENCE TO RELATED APPLICATIONS

This is a continuation-in-part of U.S. application Ser. No. 08/334,783 filed Nov. 4, 1994, abandoned.

BACKGROUND OF THE INVENTION

1. Field of the Invention

The invention relates to the field of telecommunications outlets for connecting devices using various cable media and connectors. More specifically, the invention provides an enclosure with an array of receptacles for accepting a number of different media connectors and cable management features to allow high integrity transmission paths and compliance to industry standards to service multiple work areas.

2. Prior Art

Many different types of telecommunications wall mount housings exist. They all, however, include drawbacks such as unsightly labeling. This situation is onerous with respect to larger outlets since they are difficult to conceal. Smaller outlets do not present the same degree of aesthetic problems, due to their size. Labeling is generally mounted directly on the cover of the outlet in plain view. This generally detracts from the appearance of the outlet. Moreover, labels are most frequently hand written by the installer and, therefore, detract further from the appearance of the unit and consequently the workplace. Another drawback of prior art systems is that many do not provide gravity feed connections, which are desirable; those that do provide gravity connections mount them on the lowest edge of the housing; these are clearly difficult to inspect.

A further drawback of many of the housings is that they do not provide excess cable management within the box; of those that do, they generally do not provide sufficient management structure to manage all the cables utilized while maintaining minimum bend radius requirements.

It is also a drawback of the prior art that many of the commercially available housings leave connections completely unprotected from impact.

The present invention alleviates all of these drawbacks by the configuration and structure thereof.

SUMMARY OF THE INVENTION

The above-discussed and other drawbacks and deficiencies of the prior art are overcome or alleviated by the multimedia outlet of the present invention.

In accordance with the present invention, a multimedia outlet is presented which provides several advantages over prior an outlets. For example: the present invention provides gravity feed connection for all of the connectors utilized in the outlet. This may be as few as one and as many as twenty-four. The gravity feed connectors, while providing minimal to no angles in the cable, do still maintain an inspectability of the icons utilized therein to identify the jack or connector.

Another advantage of the present invention is the unit's overall aesthetically pleasing enclosure and exterior accouterments. The outlet, as opposed to a twisted pair or optical fiber cable patch panel, will be located in the work space of an office or the like. Therefore, aesthetics are important in the configuration. The invention herein, however, utilizes the configuration not only for aesthetics, but for functional purposes as well, such as the above noted gravity feed connections. Another part of the functional/aesthetic configuration is protection of the connections. Since the connections are placed on a sloped surface which converges downwardly, the connections are protected from objects falling in the vicinity of the multimedia outlet and from impacts from personal body parts or office furniture, etc.

A further advantage of the present invention over the prior art is that SP-2840-A (draft: to be published in January 1994 as ANSI/TIA/EIA-568-A) for storing excess cabling and maintaining bend radius requirements, especially of fiber optic cable, has been complied within the configuration and structure of this invention. This compliance is entirely within the enclosure thus protecting the cable while maintaining such compliance.

Additionally, the invention provides an optional second tier of cable management in the form of a spool or tray releasably attachable to a molded engagement member in the enclosure of the multimedia outlet. The two tiers of cable management can be employed to handle greater mounts of cable or may be employed to separate different types of cabling for the different connectors. A unique feature of the spool embodiment is its ability to entrap the coiled cable. An angled gap is provided for entry of the cable. This requires that the cable be bent to match the angle of the gap, to be inserted into the spool; once inserted the cable springs back to its generally straight form and cannot escape from the spool.

A further object of the invention is to provide a readily accessible, aesthetically hidden label for identification of all relevant information with respect to the unit. This is accomplished by placing the label in a cavity under a flush mount face plate which can be hingedly or otherwise mounted to the body of the enclosure.

The invention is mountable using screws, apertures for engagement to standard U.S. or European single or double-gang electrical boxes, adhesive tape or magnets to affix the unit to most available wall or structural surfaces.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
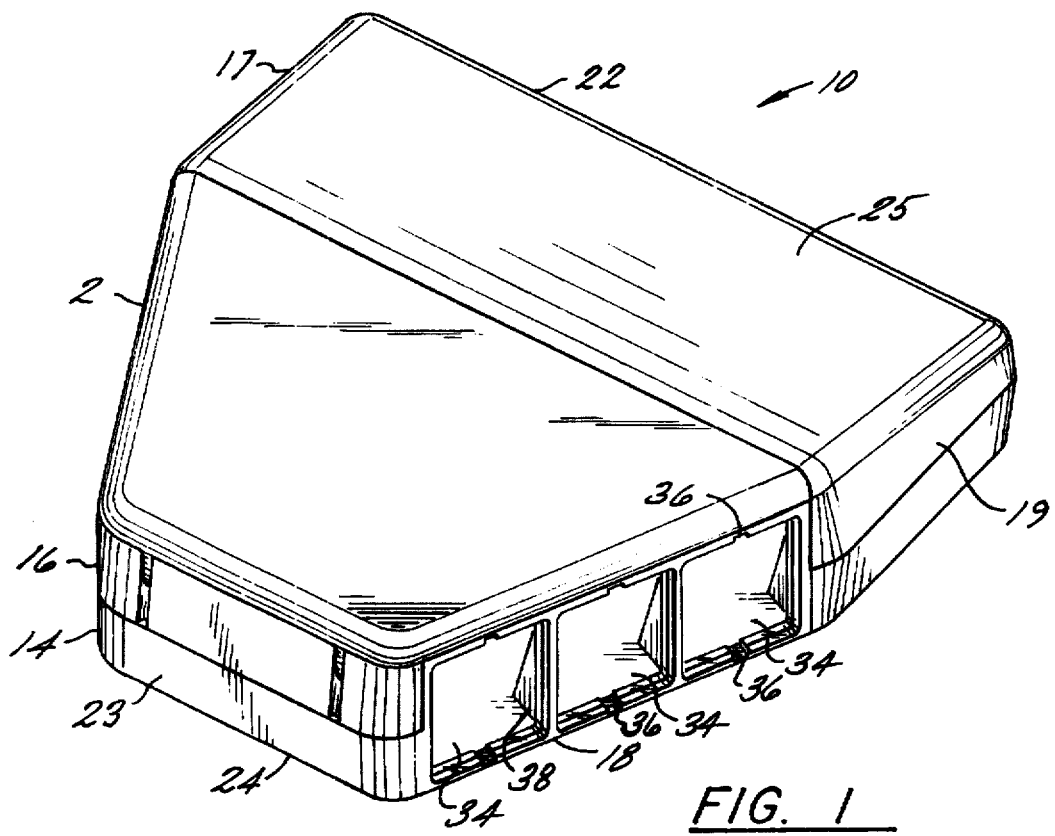
FIG. 1 is a perspective view of the invention without connectors.
Figure 2:
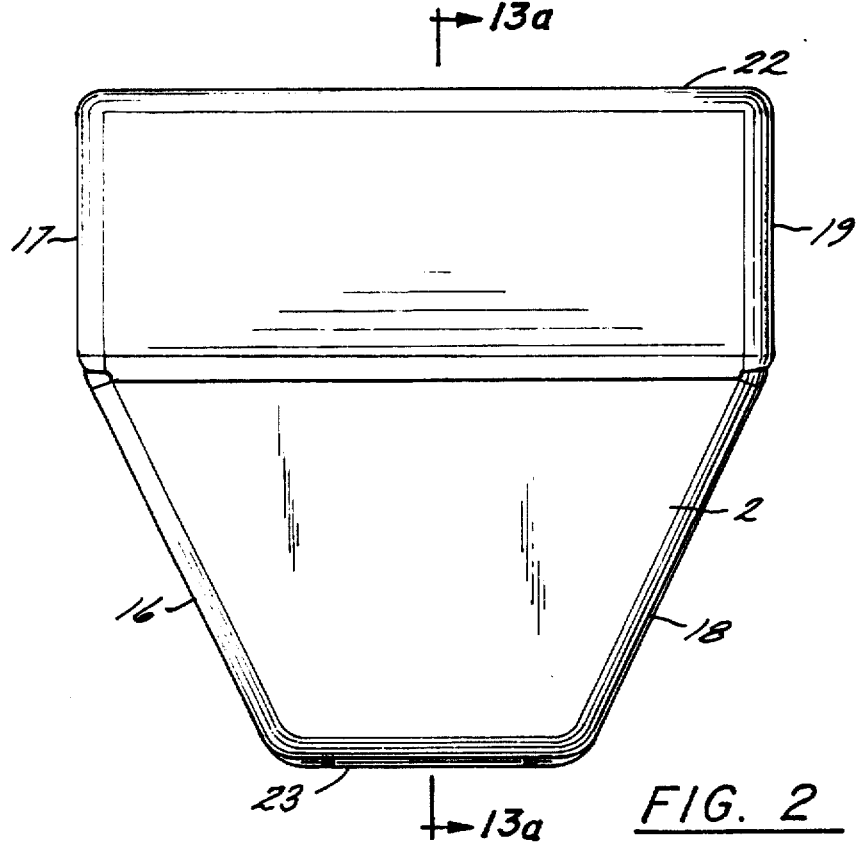
FIG. 2 is a front view of the invention.
Figure 1A:
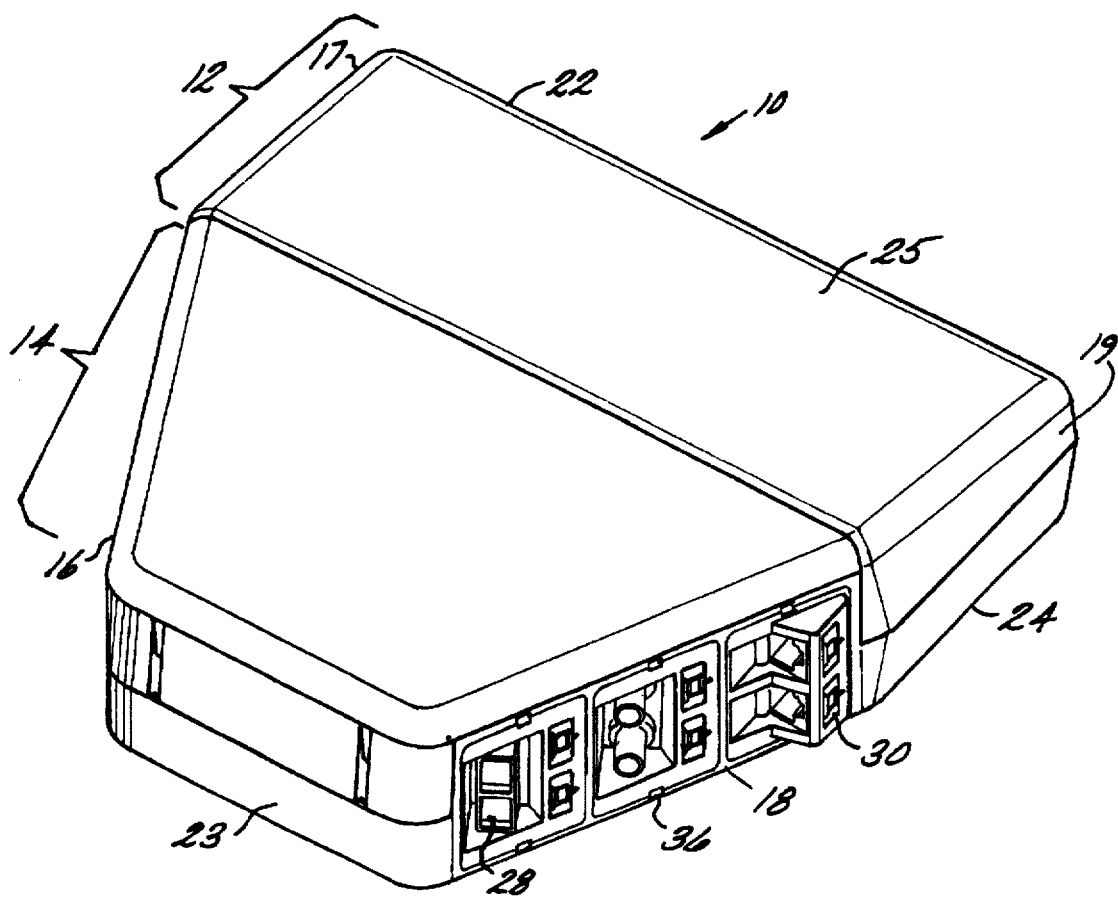
FIG. 1a is a perspective view with connectors.
Figure 5:
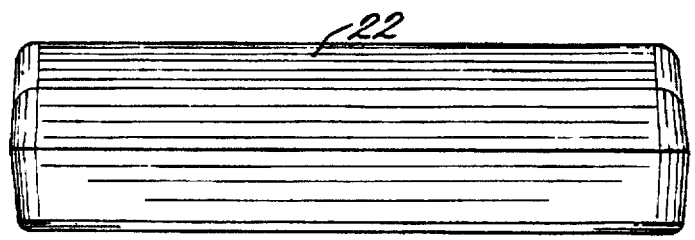
FIG. 5 is a top view of the invention.
Figure 3:
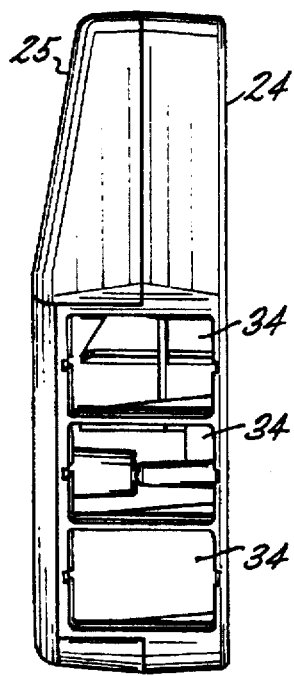
FIG. 3 is a side view of the invention.

The enclosure 10 of the multimedia outlet of the present invention is best illustrated in FIGS. 1 and 1a. As will be appreciated, the shape of the outlet is complex, including a rectangular upper section 12 and a trapezoidal lower section 14. The lower section 14 houses on each of its two downwardly converging lower sides 16 and 18, at least one but preferably three receptacles 34 for accepting modular connector assemblies of the types disclosed in U.S. Pat. Nos. 5,217,190, 5,228,869, 5,295,869, and U.S. Ser. Nos. 08/277,079 and 08/301,272 all of which are assigned to the assignee hereof and are incorporated herein by reference.

The enclosure itself includes, in the most preferred embodiment and configuration, a top 22, bottom 23, upper and lower left sides 16 and 17, upper and lower right sides 18 and 19, back 24 and front cover 25. It will be appreciated that the division of upper and lower sides is merely a preferred configuration and is not limited thereto. For example, the sides could easily be in a single plane each as well as in other configurations.

The most important feature of the sides (lower sides 16 and 18, in the preferred embodiment) is the fact that the sides are angled inwardly in a downwardly direction. This provides the unique and substantive advantage of gravity feed. Gravity feed, as is known to those of skill in the art, is the desirable orientation of outlet telecommunications connectors, which prescribes that a cable connected thereto emerges in a downwardly direction. This is distinguishable from prior art in-wall mounted and surface mounted connectors which orient connected cables at a 90° angle to the vector of gravity; this is common in household and office telephone and computer jacks. Such an orientation causes fatigue of the cable due to the bend it experiences immediately adjacent the plug. Moreover, the cable and plug assembly are subject to damage from falling objects or even personnel bumping the assembly with a body part, purse, briefcase or chair, etc. Needless to say, these are undesirable drawbacks.

The present invention alleviates this drawback by providing the angled sides 16 and 18 of the enclosure 10. The sides 16 and 18 are most preferably angled at 25° from the vertical, 65° from the horizontal top 22, but it will be understood that the angle may diverge from the stated optimum, providing gravity feed is maintained.

As illustrated in FIG. 1a any of the telecommunications connectors disclosed in the above identified and incorporated patents may be utilized in the multimedia outlet. Since both gravity feed modular connector assemblies 30 (shown in FIG. 1a) and standard modular connector assemblies (not shown) are employed, the preferred angle of 65°, measured from the horizontal top 22 of enclosure 10 has been chosen to accommodate both types of connectors. Where a gravity feed connector 30 is employed, the resulting angle of the cable emerging from the connector is vertical, which is highly desirable. Where standard connector assemblies are employed, however, the angle is 65° from the horizontal, which is within the range of angles desired for gravity feed connections.

In the most preferred embodiment, three receptacles 34 for modular connector assemblies are present on each lower side 16 and 18 for a total of six receptacles 34. Additional receptacles 34 could be created by elongating lower sides 16 and 18 or by placing such receptacles in alternate areas of enclosure 10.

To facilitate the removability of the modular connector assemblies from receptacles 34, recesses 36 are provided within the perimeter of the receptacles. The recesses 36 allow the insertion of a small object, preferably a screw driver, to urge the detent of the modular connector assembly inwardly to unlock the same so that removal of the connector 30, from receptacles 34 can be accomplished.

Since the insertion of modular connector assembly 30 requires application of force to the lower sides 16 and 18, supports 38 are provided for extra stiffness. Preferably supports 38 are employed at each end of each receptacle 34 for maximum support of lower sides 16 and 18. As top 22, bottom 23 and upper sides 17, 19 do not experience significant forces during installation of modular connector assemblies, supporting structures are not necessary. Supports 38 are fixedly connected to lower sides 16, 18 and to back 24.

It should be recognized that the configuration of the enclosure 10 also lends itself to telecommunications connectors that are not a part of a modular connector assembly. More specifically, if the lower walls were formed without receptacles 34, simple apertures could be drilled to accept connectors.

Figure 13A:
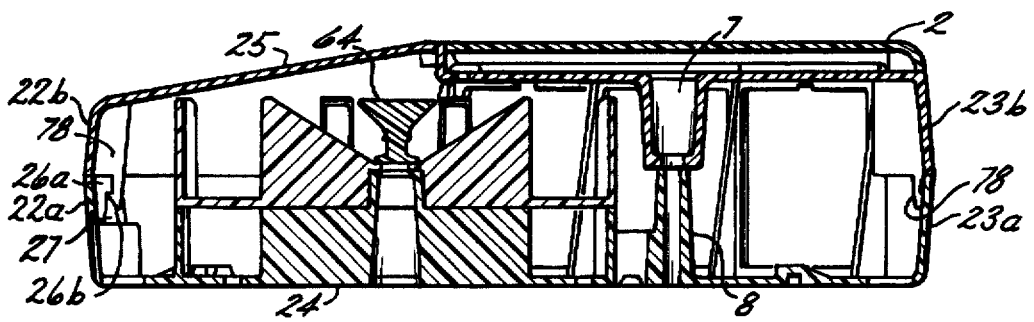
FIG. 13a is a section view of the invention taken along section line 10—10 from FIG. 2 illustrating the latching system.
Figure 12:
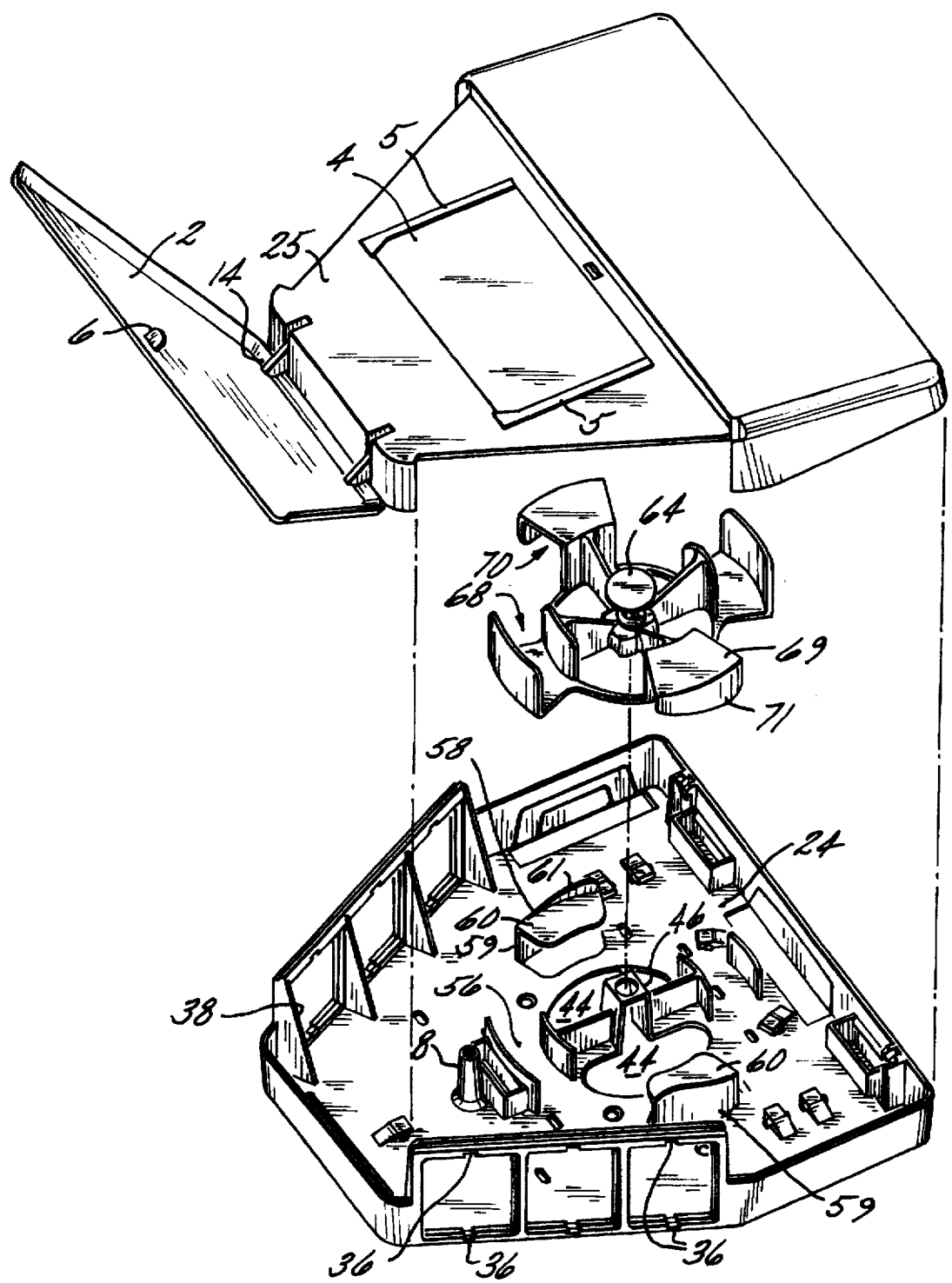
FIG. 12 is an exploded perspective view of the front cover with the face plate open to illustrate the identification label and compartment of the invention.
Figure 13:
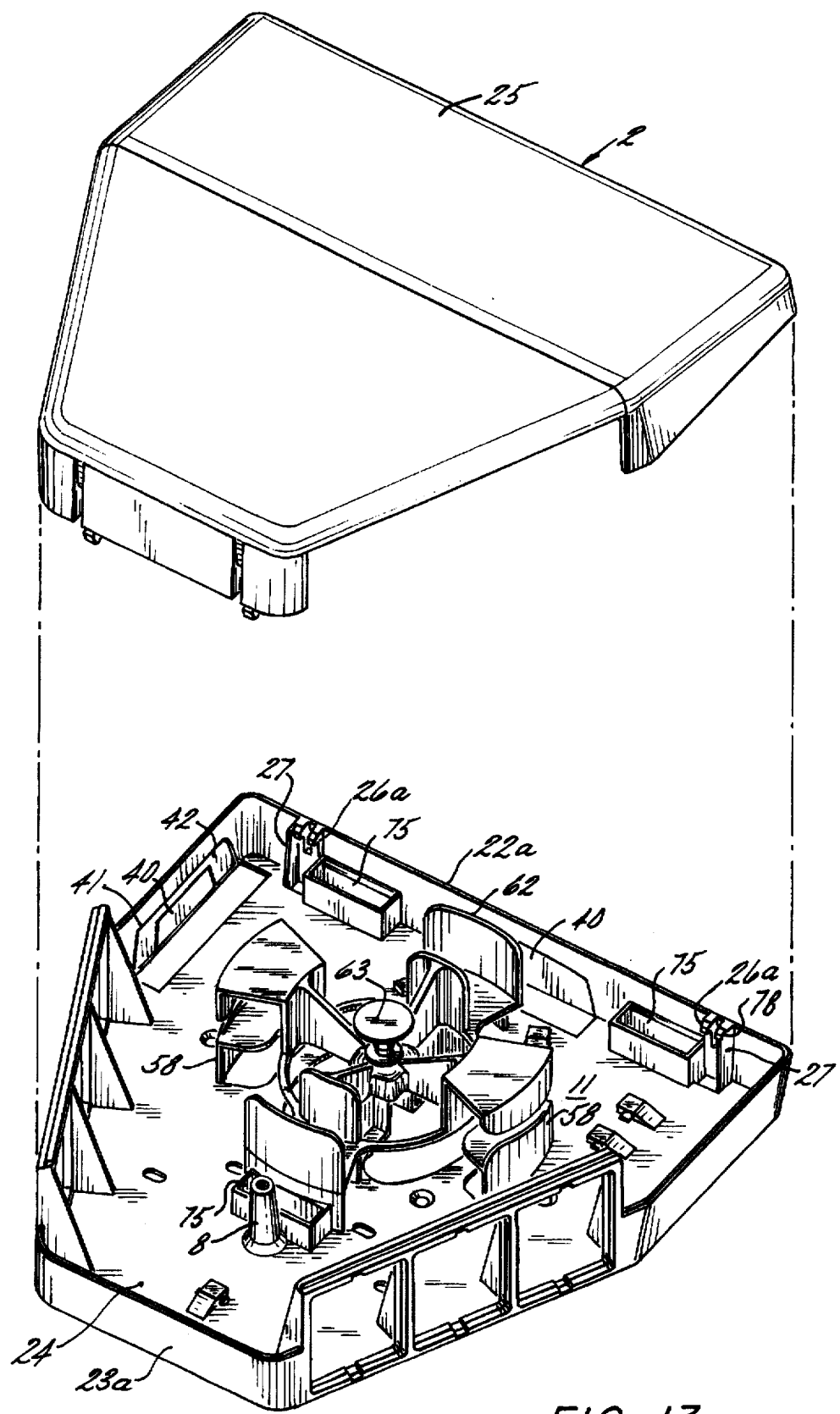
FIG. 13 is a perspective view of the invention with front cover removed.

In order to supply cable to the several connectors 28, 30, several cable in-roads are provided. Referring to FIGS. 12 and 13, the most preferred embodiment provides four raceway knockouts 40, although fewer or more may be provided for differing applications. The raceway knockouts 40 provide large and small knockout segments 42 and 41, respectively. Differing knockout sizes is for aesthetic reasons. In the most preferred embodiment, only large knockout segment 42 is provided on top 22 of enclosure 10, whereas both small and large knockout segments 41 and 42 are provided on upper sides 17, 19 and bottom 23. The provision of raceway knockouts 40 around the perimeter of enclosure 10 enables easier access to the interior cavity 11 thereof by cables incoming or outgoing in any direction. Although the preferred embodiment only provides a large top knockout 42, it is possible to provide the two segment knockouts.

Figure 4:
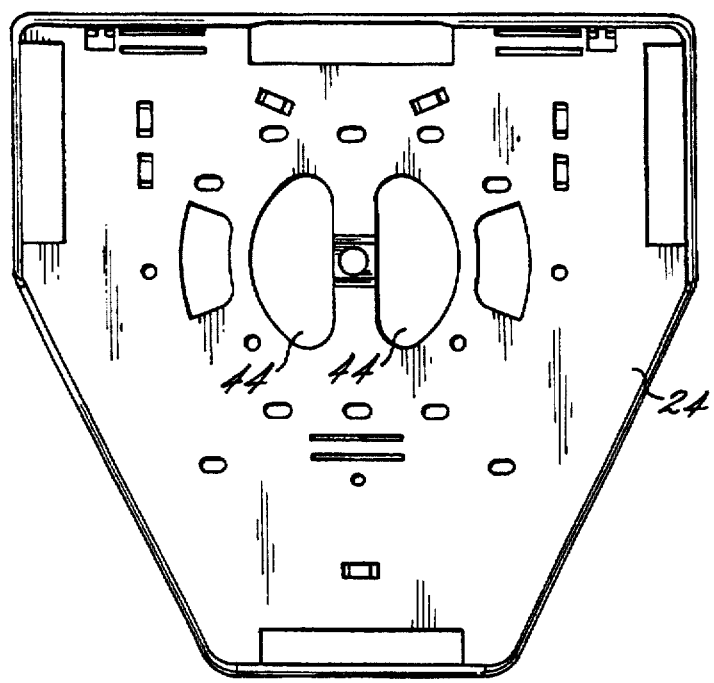
FIG. 4 is a back view of the invention.
Figure 6:
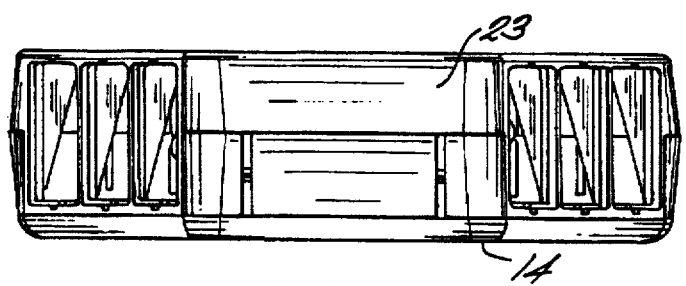
FIG. 6 is a bottom view of the invention.
Figure 8:
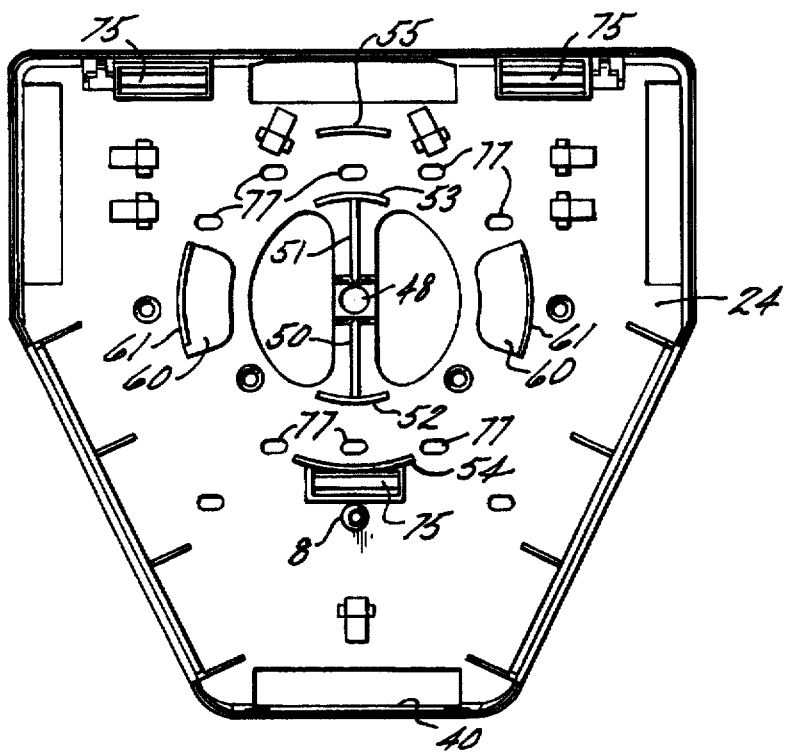
FIG. 8 is a front view of the invention with front cover removed without the spool.

The interior cavity 11 of the present invention is rendered even more accessible to cable by providing cable entry ports 44 in back 24 of enclosure 10. As is illustrated in FIGS. 4 and 8 cable entry ports 44 are located generally centrally within back 24. Thus, in-wall cable or raceway may enter the outlet enclosure 10 without being seen by a user at all.

Figure 9:
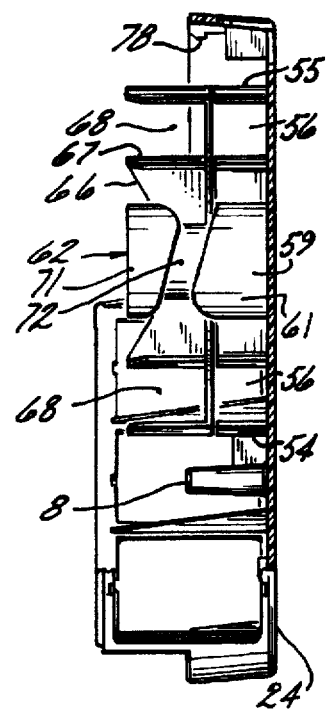
FIG. 9 is a section view taken along section line 9—9 from FIG. 7 illustrating a side view of the spool of the invention.

Referring now to FIGS. 8, 9 and 12 the cable management system is illustrated. As can be viewed in the drawings, back 24 includes several structures extending therefrom in positions to advantageously receive excess cable and maintain that cable in a minimum bend radius of 1.18 inches or greater in the case of fiber optic cable and four times the outer diameter of the outer jacket for twisted pair copper cable.

Centrally located on back 24 is protuberance 46 which defines engagement socket 48 (to be discussed hereunder). Extending from protuberance 46 are webs 50 and 51 and their respective flanges 52 and 53. Flanges 52 and 53 are preferably curved such that a continued arc would include both flanges in a circle coaxial with socket 48. Spaced from each flange 52, 53, are respective fins 54 and 55 which are slightly curved laterally and which extend generally perpendicularly from back 24. If the arc of each fin were continued, the circle circumscribed thereby would be generally concentrically arranged with a circle defined by the arc of flanges 52 and 53. Flanges 52 and 53, in conjunction with fins 54, 55 and back 24, define a trough 56 for management and retention of cable. Trough 56 in combination with spool 62 can manage a significant amount of cable and maintain such cable within minimum bend radius requirements compliant with industry standards.

Further retention means, for use in conjunction with trough 56, may also be included in the form of at least one hooked structure 58 which is formed by a projection 59 extending generally perpendicularly from back 24 and having a branch 60 extending generally perpendicularly to the projection, and generally parallel to the back 24 in a direction toward the protuberance 46. The hook forms a hollowed structure to contain excess cable. The hooked structure 58 is positioned to cooperate with trough 56 to manage cable. In the most preferred embodiment two hooked structures 58 are utilized as shown in FIG. 13.

A further feature of hooked structure 58 is an extension 61 extending from the projection 59 past the intersection between projection 59 and branch 60. The extension 61 is angled from one end thereof to the other end thereof to define an angled side view as illustrated in FIG. 9. This extension 61 is employed only when an optional spool for additional excess cable management is desired. Spool 62 is utilized in an alternate embodiment of this invention.

Figure 11:
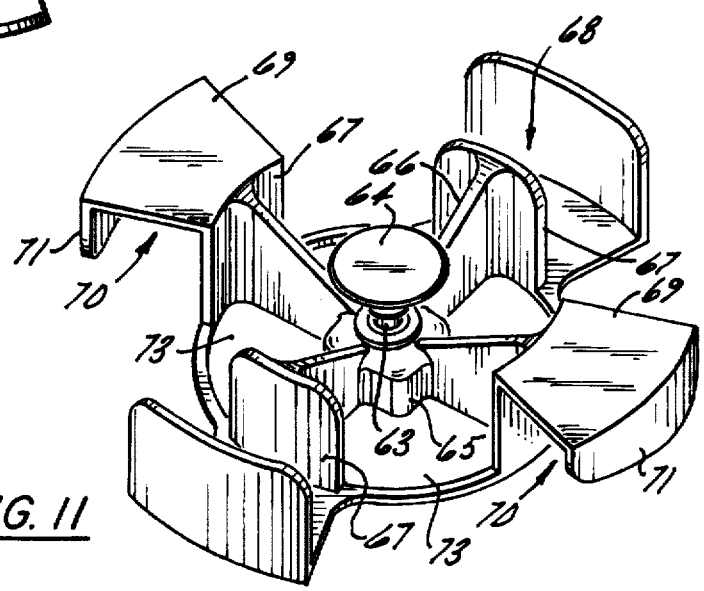
FIG. 11 is a perspective view of the spool of the invention.

Referring now to FIG. 11, spool 62 is a second tier of cable management and sits directly atop the above described parts of the first tier of cable management. Spool 62 includes a snap latch 63 which is adapted to engage with engagement socket 48. Snap latch 63 includes release tab 64 for disengagement if desired. To disengage the latch one must merely pull up on the release tab 64.

Figure 10:
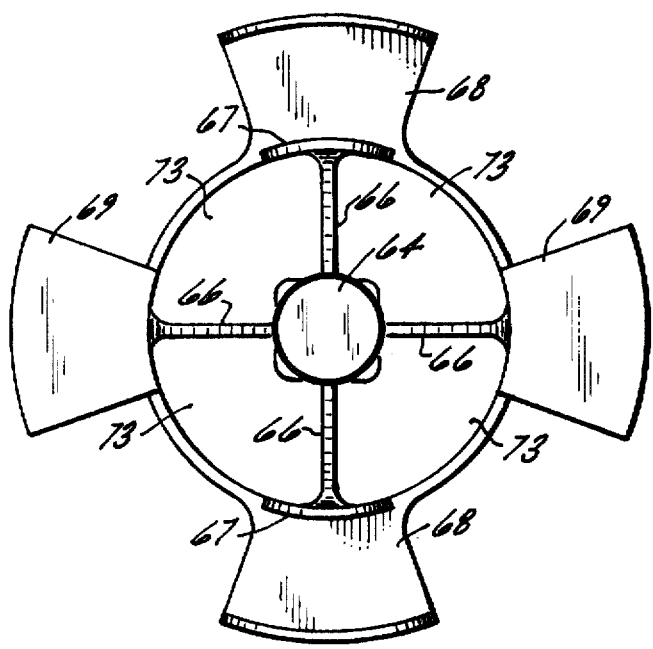
FIG. 10 is a plan view of the spool of the invention.

Spool 62 comprises a center section 65 adapted to fit over protuberance 46. Center section 65 and protuberance 46 have a square shape to prevent spool 62 from rotating once engaged. From center section 65, spool webs 66 connect to spool guide members 67. In the preferred embodiment, two of the guide members 67 are joined with further material to form a spool trough 68. The spool troughs 68, when the spool is engaged, are oriented substantially similarly to the trough 56 on back 24 of enclosure 10. The other two spool webs 66 end in cable retention members 69 which provide inverted channels 70. At the outermost end of cable retention members 69 is spool flange 71. Spool flange 71, as illustrated in FIGS. 10 and 11, has an angled side view which is complimentary to extension 61 found on hooked structure 58; described above. Upon engagement of spool 62 with engagement socket 48, the angle of extension 61 and the angle of spool flange 71 form a narrow gap 72 running at an angle. This angled narrow gap 72 is highly effective in providing an easy entry point for cable while concurrently preventing the escape of said cable.

A technician inserting cable into the spool management area will simply deform the cable to match the angle of the gap 72 and then easily insert the cable into the spool management area. Once inserted, however, the cable will assume its normal undeformed shape and thus will not be aligned with the gap 72. Therefore the cable cannot escape from the spool management area. It should be noted that cable may be routed into the spool 62 from any of the holes 73 in the base area thereof.

Figure 7:
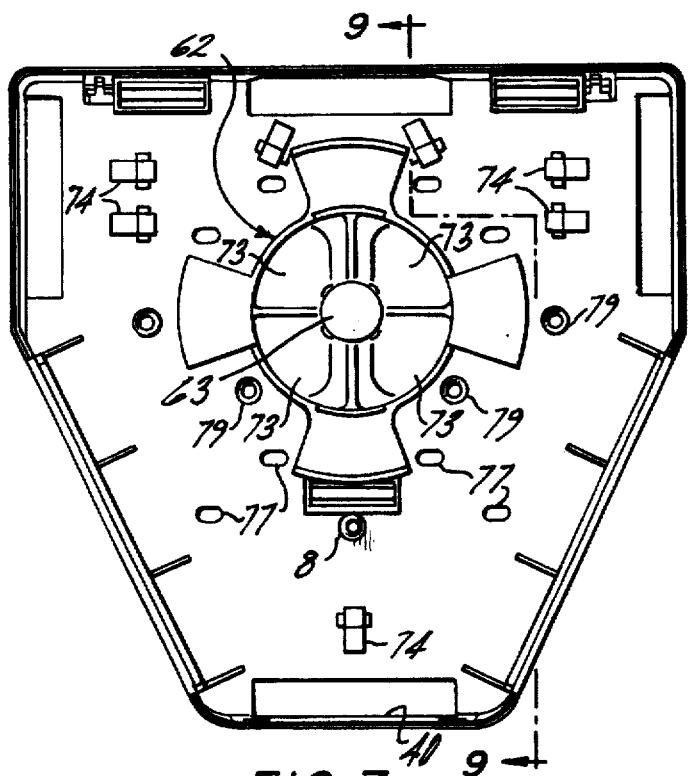
FIG. 7 is a front view of the invention with front cover removed and spool in place.

Referring now to FIGS. 7, 8 and 13. Also provided as features of the back 24 of enclosure 10 are a plurality of strain relief anchor points 74. In the most preferred embodiment, anchor points 74 are molded into back 24 of enclosure 10 and are engageable with cable ties (not shown). Any number of anchor points are possible and they may be positioned in various locations.

Mounting of the multimedia outlet is accomplished most preferably in two ways: magnetically, slot engagement and threaded fasteners. For magnetic mounting, at least one, and preferably three, magnets are retained in magnet braces 75 located at various locations on the enclosure 10. Preferably the magnet braces 75 are located, two along top 22 and one centrally below the protuberance. The braces are simply structures adapted to press fit or glue in a magnet so that the edge thereof can contact a ferrous surface for adhesion thereto. The slot engagement system, for threaded fasteners, includes slots 76 positioned preferably for U.S. single or double-gang outlets into which screws are threaded. Chamfered holes 79 are for mounting to European outlets. Threaded fastener engagement is most preferably by means of screws, and the screws are placed in screw openings 77. It will be understood, however, that other forms of attachment are possible such as double stick tape, etc.

Referring now to FIG. 12, a final feature of the first preferred embodiment of the multimedia outlet of the invention is the hinged faceplate 2 on the front cover 25. The hinged faceplate 2 is most preferably hinged at the bottom of the lower section 14 of enclosure 10. This facilitates reading or changing of label 4 which is preferably an array of 12 perforated standard industry size labels and is removable by sliding the label 4 out of label guides 5. Label cover 2 closes by means of any conventional latching arrangement but most preferably is closed by a press latch 6 as shown in FIG. 12. It will be appreciated that label cover 2 may be attached in many other ways than by hinges and that hinges are merely the preferred embodiment.

Front cover 25 is attachable to top wall 22a and bottom wall 23a, by any conventional means, most preferably latches 78. The latches of the first preferred embodiment are illustrated in FIGS. 13 and 13a. It will be appreciated from the FIGURES that when engaged the latches 78 deter or prevent movement of the front cover 25 relative to the back 24, top 22a, bottom 23a and sides. This is accomplished in the preferred embodiment by providing an interlocking latch system having interlockingly opposed engagement members 26a and 26b and having channel defining members 27. When engagement members 26a, 26b are in the engaged position, they extend past one another into a void defined by the other of the engagement members and the channel defining members 27. The extension past one another and engagement with each other in combination with channel defining members 27 prevents movement relative to back 24. Release of the front cover 25 of the preferred embodiment is accomplished by pressing inwardly on top wall 22b and bottom wall 23b of front cover 25, which disengages the latches so the front cover 25 can be removed. Other conventional arrangements are likewise possible. In addition hereto, and in order to deter unauthorized entry into enclosure 10, a screw is positioned in a well 7 extending from front cover 25, behind label 4, and is received in boss 8, which extends from back 24. This will prevent opening of the unit even if the latches are disengaged.

Figure 14:
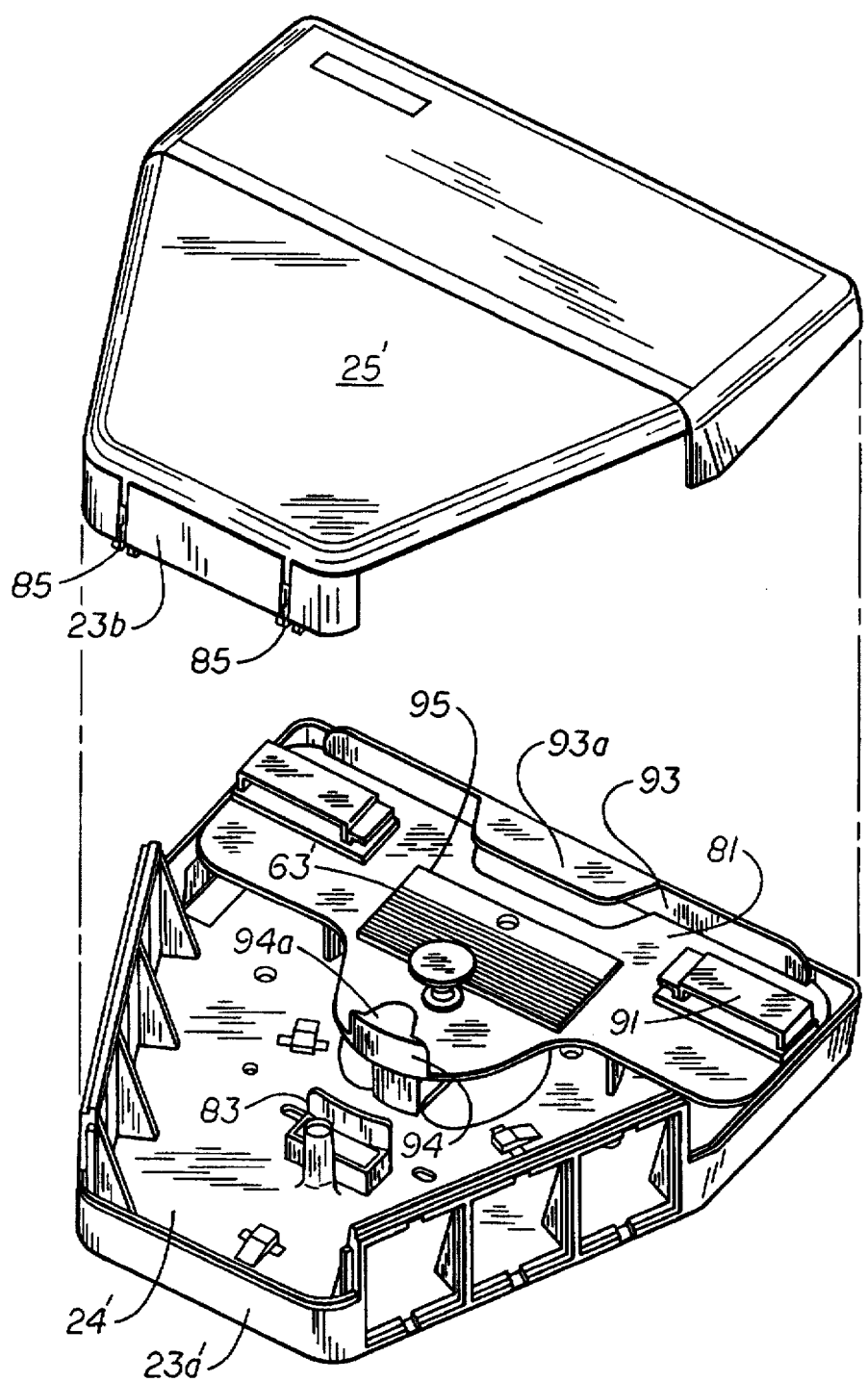
FIG. 14 is a perspective view of an alternate embodiment of the invention with the cover removed.
Figure 15:
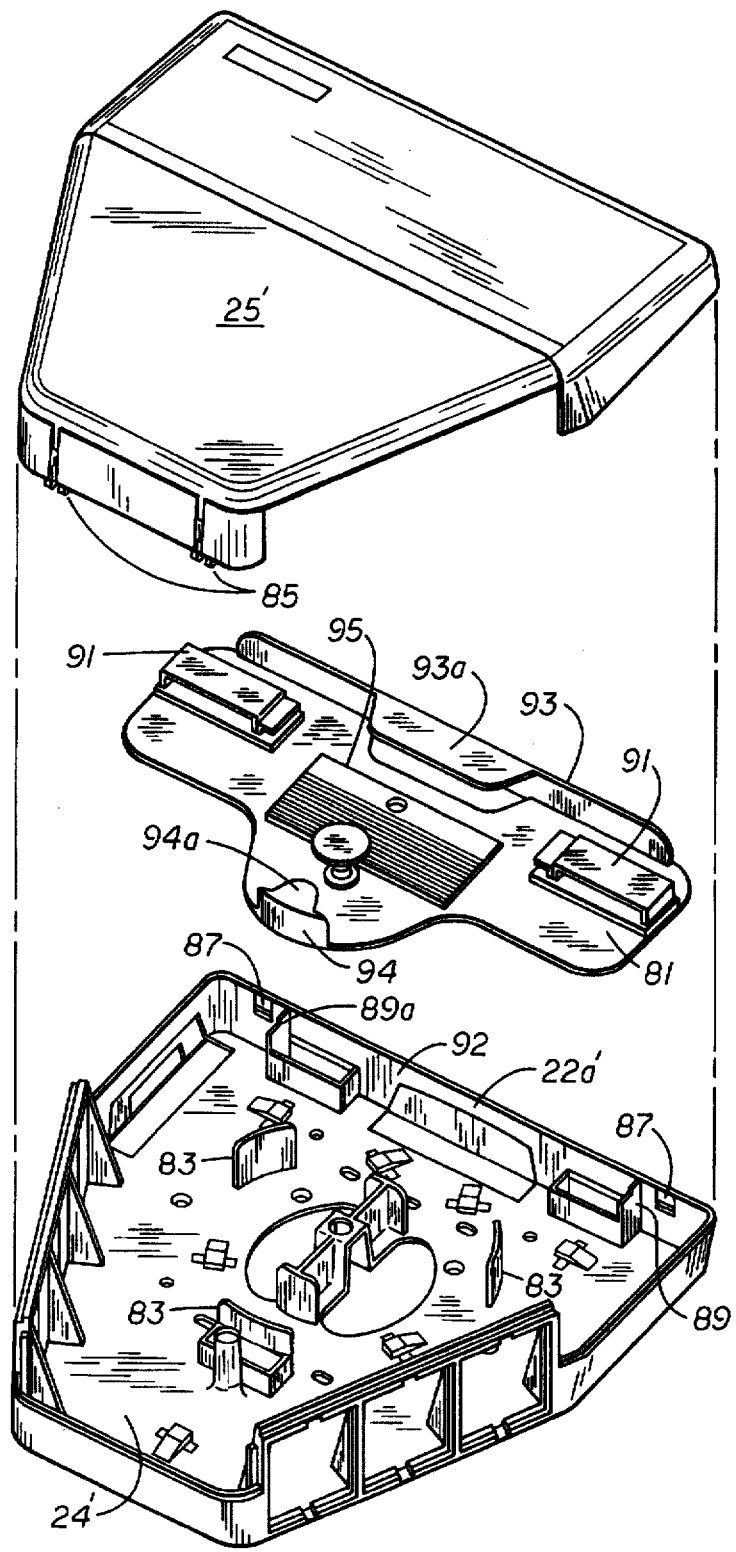
FIG. 15 is a fully exploded perspective view of the embodiment of FIG. 14.
Figure 15A:
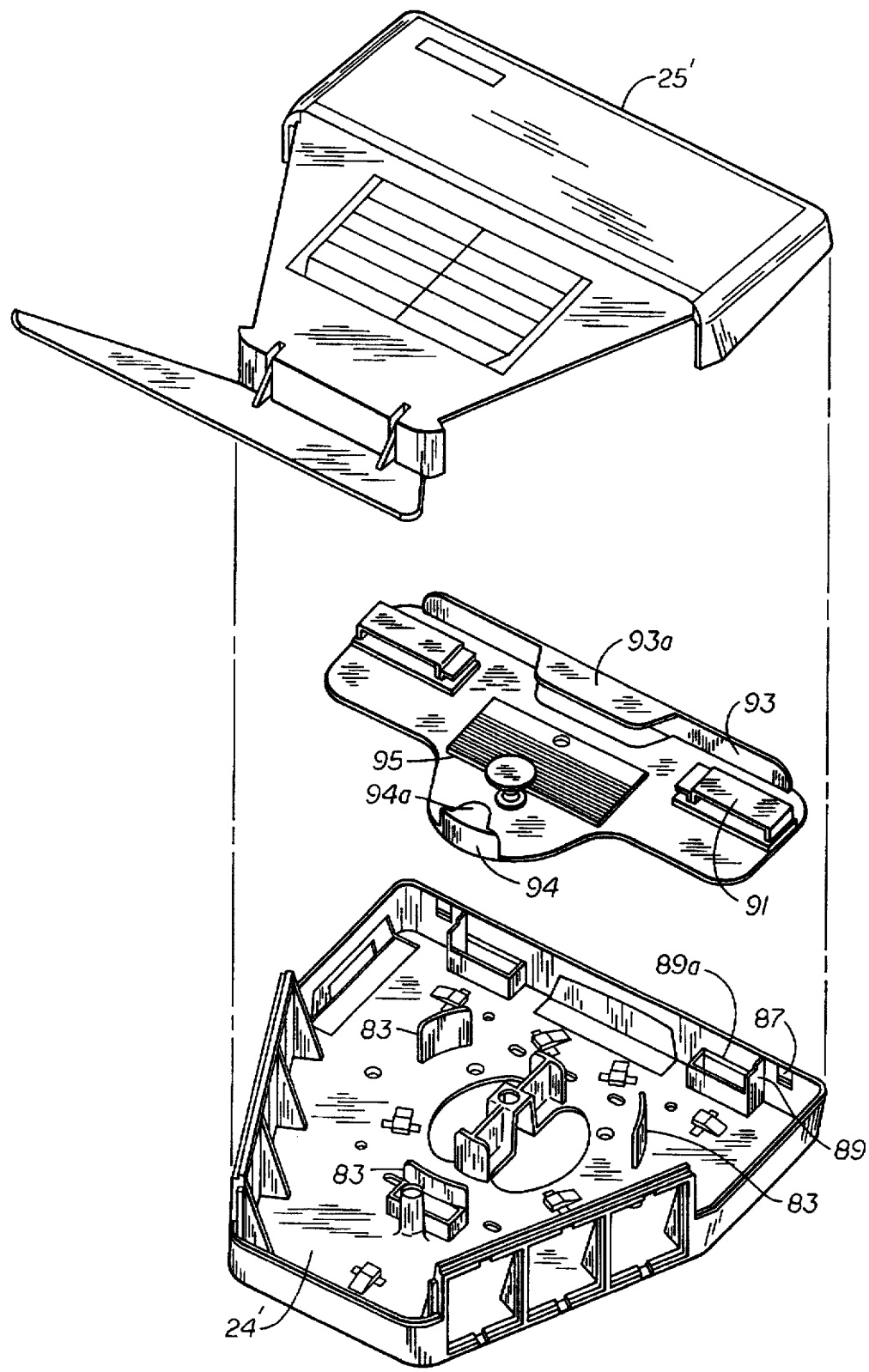
FIG. 15a is the view of FIG. 15 with the normally hidden label exposed.
Figure 16:
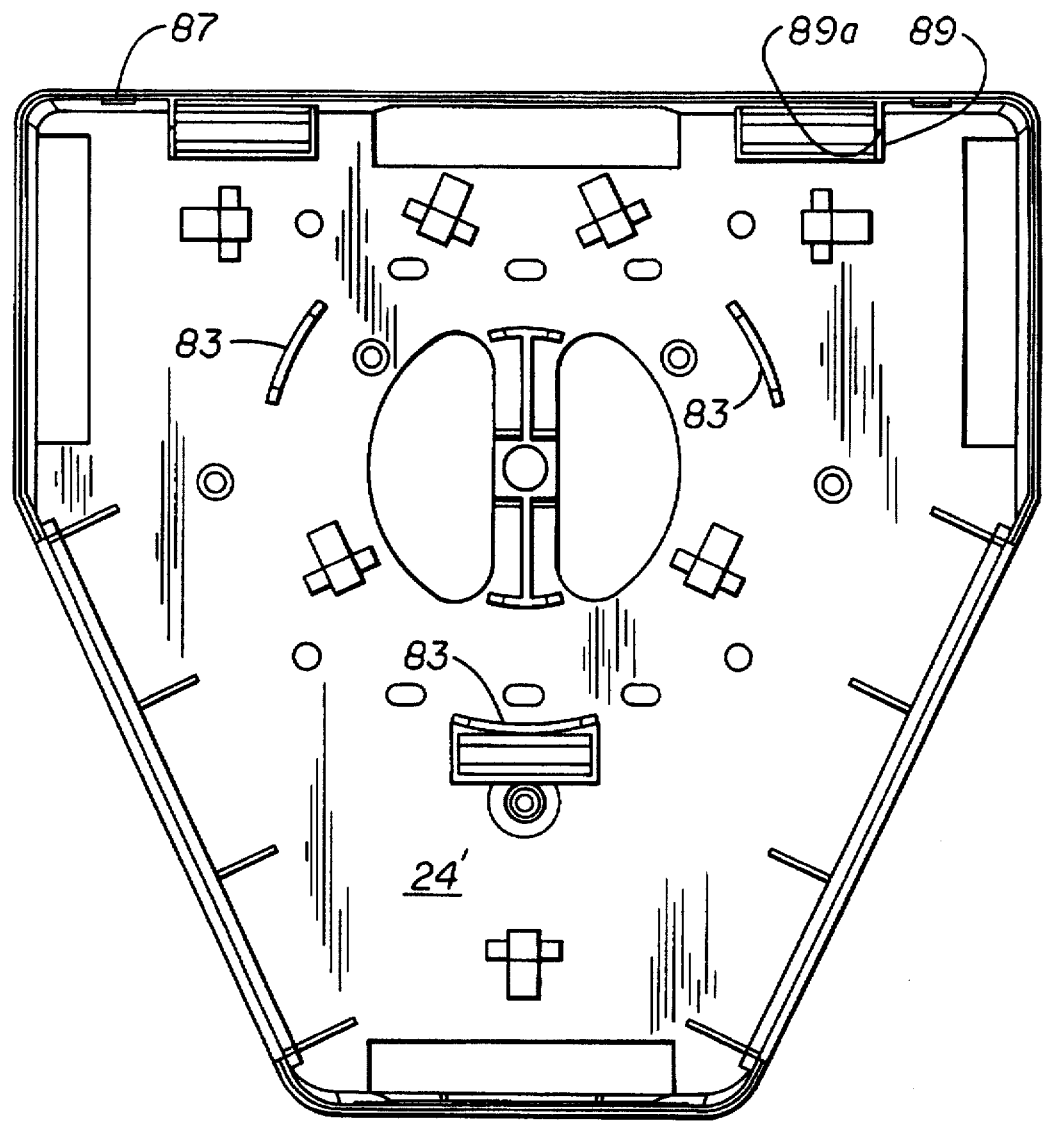
FIG. 16 is a plan view of the back of the embodiment of FIG. 14.
Figure 16A:
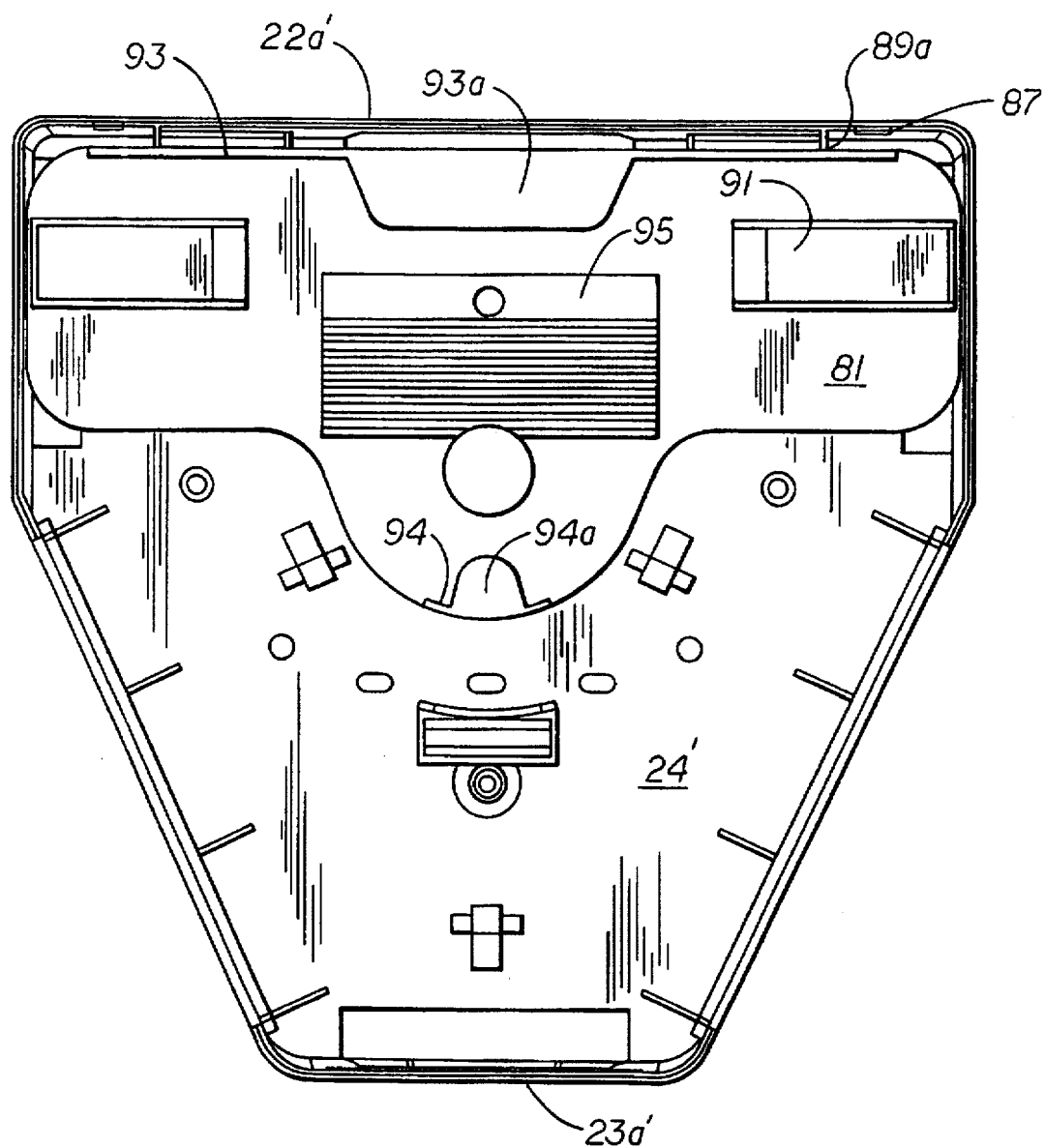
FIG. 16a is FIG. 16 with removable cable management/ splice tray in place.
Figure 17:
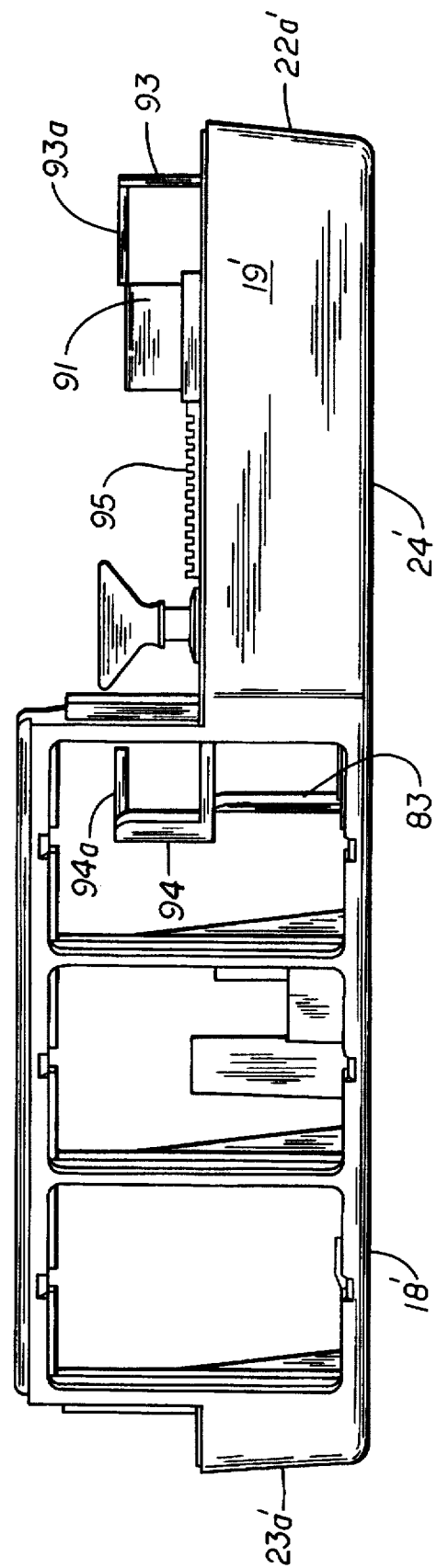
FIG. 17 is a side elevation view of the embodiment of FIG. 14 without the cover.
Figure 18:
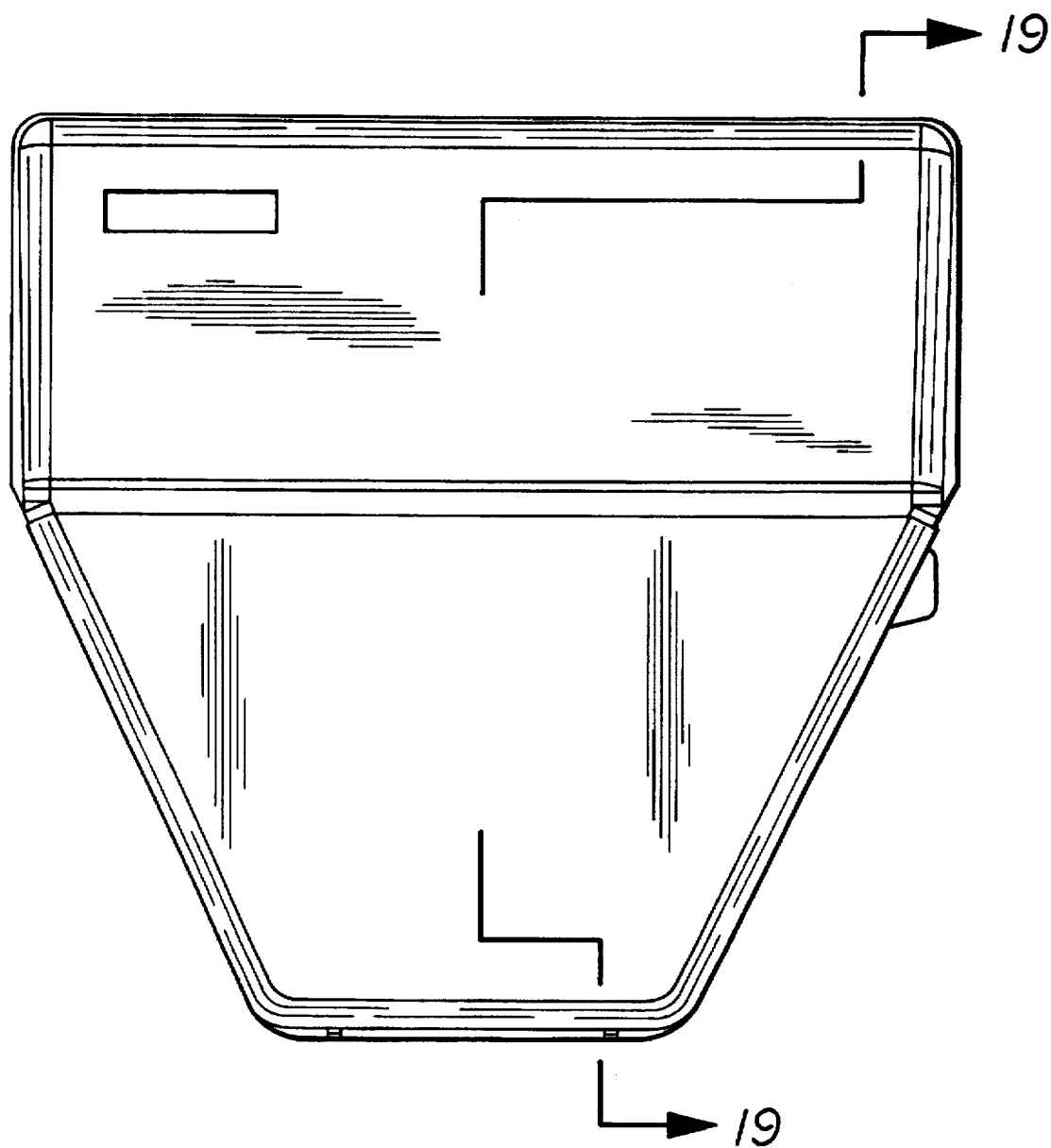
FIG. 18 is a plan view of the assembled invention.
Figure 19:
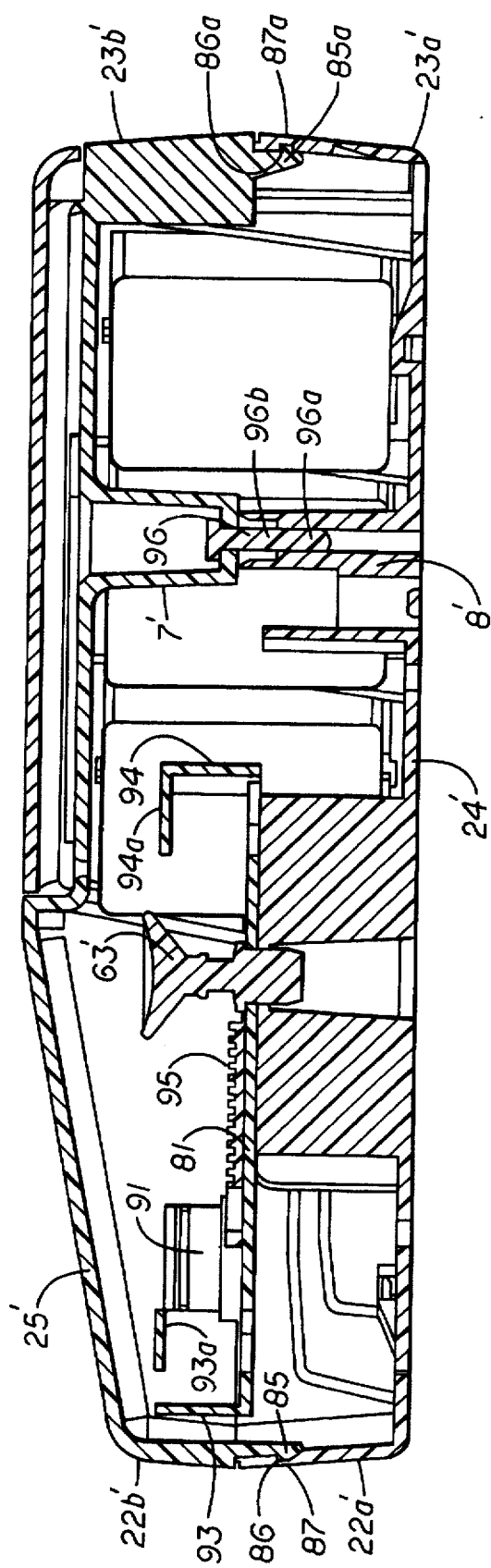
FIG. 19 is a cross section taken along 19—19 in FIG. 18.

Referring to FIG. 14 et seq an alternate preferred embodiment is illustrated. In this embodiment the spool present in the first discussed embodiment has been replaced with a cable management tray 81. Tray 81 is attached to back 24' in the same manner as spool 62 is attached to back 24 i.e., by being supported from below (or behind, if the outlet is properly oriented for use). Struck up members 83 which appear similar to fins 54 and 55 of the first embodiment provide support for tray 81. Members 83 are different however in that they are positioned differently and are less complex. More particularly, members 83 are merely most preferably thin perpendicular extensions of back 24'. Additionally, members 83 function to provide cable management below tray 81 (or behind with the outlet oriented for use). Back 24' also includes two other features which differ from the first described embodiment.

In order for latches 85 to extend to catch holes 87, tray 81 must be maintained away from top wall, 22a' of back 24'. Adequate spacing for latches 85 is maintained by shoulders 89 extending from inside surface 92 of top wall 22a', inwardly toward a space defined by top, bottom and side walls of back 24'. The shoulders 89 support tray 81 while edge 89a of each shoulder 89 keeps the upper end thereof away from top 22a'. It will be appreciated that tray 81 is maintained in position by snap latch 63', (in the same manner as 63 maintains the spool in the first embodiment), and the above discussed members 83, shoulders 89 and edges 89a.

Tray 81 includes at least one and preferably two cable management clips 91 which clips are generally known to the art. Tray 81 also includes integral capture structures 93 and 94 which each extend perpendicularly from the major plane of tray 81. Each capture structure 93 and 94 further include flanges 93a and 94a which extend generally perpendicularly inwardly toward a center area of tray 81. Most preferably capture structure 94, is of a radiused form to accommodate the bend radius of cable or optical fibers maintained therein. Capture structure 93, 93a functions both to contain cable and to provide torsional support for the tray.

While the tray embodiment is applicable for many types of cable it is particularly suited to providing a plurality of fiber optic ports. This being the case the tray embodiment most preferably (albeit not necessarily) includes a fiber optic splice holder 95. Splice holder 95 is generally located as illustrated in the drawings and most preferably is of the mechanical or fusion type. A fusion type is illustrated. It will be appreciated that other types of splice holders are equally effective including but not limited to finger, etc., splice holders.

Another alternate arrangement provided in this embodiment is latches 85 and 85a which are more simple than those employed in the first embodiment, yet effective. Latches 85 extend from top 22b' of front cover 25' and latches 85a extend from bottom 23b' of front cover 25' into the cavity created by back 24', top 22a', bottom 23a' and sides 16', 17', 18' and 19'. Latches 85 engage catch holes 87 when at the fully engaged position. Catch holes 87 extend completely through the top wall 22a' thereby providing access from outside the outlet with a small screw driver or similar object which when inserted through the catch hole 87 from the outside will defeat the latch 85. Latches 85 include a lip 86 which dips approximately 5° from the horizontal. The lip 86 securely engages catch hole 87. With respect to bottom 23b' latches 85a include a lip 86a which does not dip but provides a ramped surface of approximately −45° from the horizontal so that latches 85a and bottom catches 87a are constructed to defeat easily upon the application of tensile stress to the cover 25'. Because of this arrangement, catch holes 87a in bottom 23b' do not extend completely through bottom 23b'. It will be appreciated that because of lip 86 on latch 85, a utensile to defeat the latch is necessary unless latches 85a are defeated first by application of tensile force thereto.

A final alternate construction of the second embodiment is a modification of the screw and boss 8 which assist in holding cover 25 on back 24. In this embodiment the captive screw 96 includes wider threads 96a than shank 96b such that the screw will not fall out of the well 7' when detached from boss 8'. Screw 96 will secure cover 25' to back 24' so that unauthorized entry will be alleviated.

It will be appreciated that each of the features of each embodiment can be intermingled.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A multimedia outlet comprising:

a) an enclosure having a structure including a top, bottom and at least two sides extending between said top and said bottom at least one of which having an acute angle between itself and a vertical reference, said structure further including a back, perimetrical edges of which are attached to said top, said bottom and said at least two sides, said back, top, bottom and said at least two sides collectively forming a base defining a cavity for receiving and managing cable, said enclosure further including a front cover removably attachable to said base, said front cover having a substantially similar perimetrical shape to said base wherein said back further includes a protuberance centrally located within said cavity and having an engagement socket therein said protuberance being formed so as to complimentarily engage a spool and wherein said protuberance and engagement socket are substantially square in shape and thereby prevent rotation of said spool when engaged; and b) at least one aperture in said at least one sidewall having an acute angle between itself and vertical reference, for receiving at least one telecommunications connector.

2. A multimedia outlet comprising:

a) an enclosure having a structure including a top, bottom and at least two sides extending between said top and said bottom at least one of which having an acute angle between itself and a vertical reference, said structure further including a back, perimetrical edges of which are attached to said top, said bottom and said at least two sides, said back, top, bottom and said at least two sides collectively forming a base defining a cavity for receiving and managing cable, said enclosure further including a front cover removably attachable to said base, said front cover having a substantially similar perimetrical shape to said base wherein said back further includes a protuberance centrally located within said cavity and having an engagement socket therein said protuberance being formed so as to complimentarily engage a spool, and wherein said spool includes a spool flange having a relatively small height on one end thereof and a relatively larger height on a second end thereof to define an angled side view of said spool flange, said spool flange being complimentarily shaped to an extension on at least one hooked structure, said hooked structure having a perpendicularly extending projection to a plane of the back and having a branch extending from said perpendicularly extending projection, generally parallel to said back, said branch extending in a central direction, said extension extending in a direction generally parallel to said perpendicularly extending projection and having a relatively small height on one end thereof and a relatively larger height on a second end thereof to define an angled side view of said extension said angled side view being complimentary to said spool flange on said spool and when said spool is engaged within said protuberance engagement socket said spool flange and said extension form a narrow gap therebetween along the angled sections, sufficient to accept a single length of cable; and b) at least one aperture in said at least one sidewall having an acute angle between itself and vertical reference, for receiving at least one telecommunications connector.

3. A multimedia outlet as claimed in claim 2 wherein said narrow gap prevents escape of the cable once it is inserted into the spool.

4. A multimedia outlet comprising:

a) a housing having at least one inlet for cable and at least one opening adapted to receive a telecommunications connector assembly, said opening being located in a wall of said housing, said housing further having a first cover;

b) a second cover removably attached to said first cover to selectively conceal and reveal indicia on either the first or second cover.

5. A multimedia outlet as claimed in claim 4 wherein said removable second cover is removably attached to said housing by at least one hinge.

6. A multimedia outlet as claimed in claim 4 wherein said indicia is a label mounted on said first cover.

7. A multimedia outlet as claimed in claim 4 wherein said indicia is a label mounted on said second cover.

* * * * *